United States Patent
Mody et al.

(10) Patent No.: US 10,386,892 B2
(45) Date of Patent: Aug. 20, 2019

(54) GILDED GLASS SCREEN PROTECTOR

(71) Applicant: CASE-MATE, INC., Atlanta, GA (US)

(72) Inventors: Saumil Chetan Mody, Smyrna, GA (US); Nitin Koshy Philip, Sandy Springs, GA (US)

(73) Assignee: CASE-MATE, INC., Atlanta, GA (US)

( * ) Notice: Subject to any disclaimer, the term of this patent is extended or adjusted under 35 U.S.C. 154(b) by 0 days.

(21) Appl. No.: 15/955,838

(22) Filed: Apr. 18, 2018

(65) Prior Publication Data

US 2018/0307278 A1     Oct. 25, 2018

Related U.S. Application Data

(60) Provisional application No. 62/487,041, filed on Apr. 19, 2017.

(51) Int. Cl.
| | |
|---|---|
| *G06F 1/16* | (2006.01) |
| *H04M 1/02* | (2006.01) |
| *H04B 1/3888* | (2015.01) |

(52) U.S. Cl.
CPC .......... *G06F 1/1656* (2013.01); *G06F 1/1626* (2013.01); *G06F 1/1637* (2013.01); *H04B 1/3888* (2013.01); *H04M 1/0266* (2013.01); *H04M 1/0283* (2013.01); *G06F 2200/1634* (2013.01); *G06F 2203/04107* (2013.01)

(58) Field of Classification Search
None
See application file for complete search history.

(56) References Cited

U.S. PATENT DOCUMENTS

2017/0212051 A1* 7/2017 De Lacerda ....... G01N 21/6447

FOREIGN PATENT DOCUMENTS

CN          203481595      *  1/2014  ............ B32B 17/06

OTHER PUBLICATIONS

E. Metreveli, "How Tempered Glass Screen Protectors for Smartphones Are Made", https://jolyjoy.com/blogs/blog/17094084-how-tempered-glass-screen-protectors-for-smartphones-are-made (Year: 2015).*

* cited by examiner

*Primary Examiner* — Jiong-Ping Lu
(74) *Attorney, Agent, or Firm* — Gardner Groff & Greenwald, P.C.

(57) ABSTRACT

A glass screen protector and methods of manufacturing thereof. In example embodiments, the glass screen protector adheres to an electronic device screen to provide protection thereto. In example forms, the glass screen protector includes a generally rectangular glass sheet and at least one pattern formed from non-conductive vacuum metallization.

13 Claims, 4 Drawing Sheets

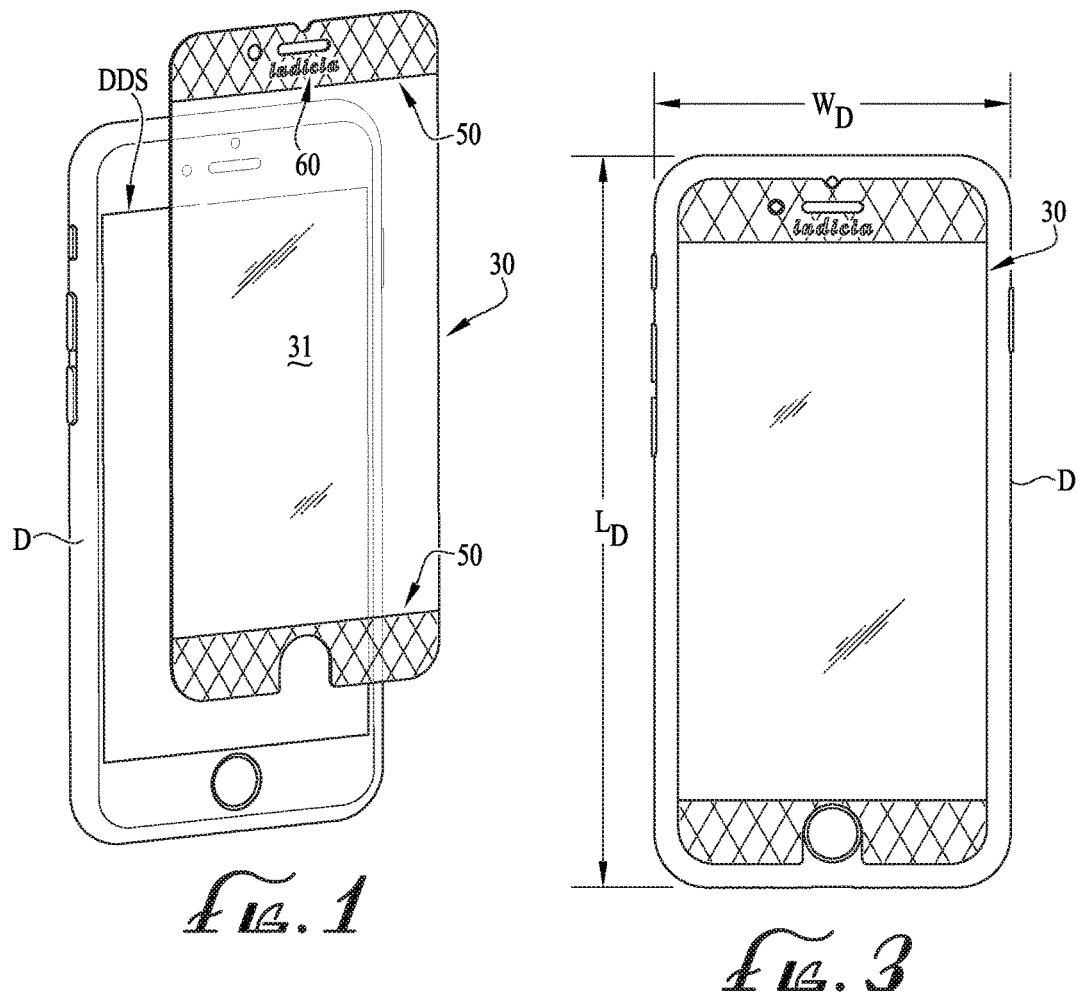
FIG.1
FIG.3
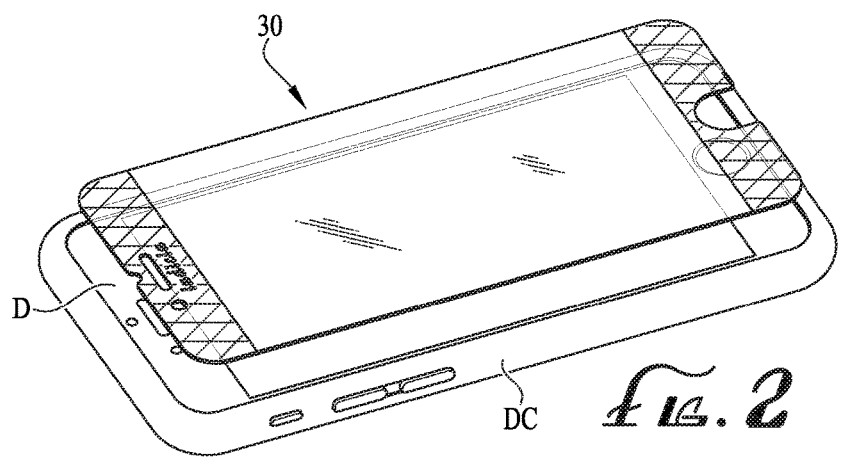
FIG.2

GILDED GLASS SCREEN PROTECTOR

CROSS-REFERENCE TO RELATED APPLICATION

This application claims the benefit of U.S. Provisional Patent Application Ser. No. 62/487,041 filed Apr. 19, 2017, the entirety of which is hereby incorporated herein by reference for all purposes.

TECHNICAL FIELD

The present invention relates generally to the field of protective covers and screen protectors for electronic devices, and more particularly to a glass screen protector and to methods of manufacture thereof.

BACKGROUND

Mobile phones and other portable electronic devices commonly include a touch screen that acts as both a display screen and an input device. In most cases, the touch screen technology used in electronic devices includes resistive systems including conductive and resistive metallic layers. Other systems can include capacitive and surface-wave based systems. Regardless of the system used, the touch screen should be cared for such that the resistive or other system permitting the operation thereof remains free from damage, for example, to reduce the likelihood of inoperability of the electronic device, permanently scratching the screen, etc. Screen protectors have been developed to protect screens of electronic devices however known screen protectors are generally formed from plastic or other polymers that do not entirely prevent damage to the screen. Furthermore, known screen protectors are plain, unornamented and unappealing such that users typically choose to use their electronic device without a screen protector, thereby substantially increasing the chances of damage to the screen.

Thus it can be seen that needs exist for continued improvement to screen protectors for electronic devices. It is to the provision of screen protector for portable electronic devices meeting these and other needs that the present invention is primarily directed.

SUMMARY

In example embodiments, the present invention provides a glass screen protector for adhering to a screen of a portable electronic device.

In one aspect, the present invention relates to a protective glass cover for adhering to an electronic device screen including a generally rectangular glass sheet and at least one pattern formed from non-conductive vacuum metallization. In example embodiments, the glass sheet defines a length and a width and front and rear side surfaces. In example embodiments, the front and rear side surfaces define a thickness therebetween. In example embodiments, the non-conductive vacuum metallization is formed on a rear side surface of the cover. In example embodiments, the cover is at least partially transparent or translucent such that the non-conductive vacuum metallization is viewable from the front side surface of the cover.

In example embodiment, the corners of the rectangular glass sheet are rounded, and a rounded edge is defined between the front and rear side surfaces. In example embodiments, indicia is applied to the front side surface by a silk screen process. In example embodiments, an optically clear adhesive layer applied on the rear side surface. In example embodiments, a protective sheet applied to the first and rear side surfaces. In example embodiments, the length is between about 101.60-304.80 millimeters, the width is between about 53.34-228.60 millimeters, and the thickness is between about 0.20-0.40 millimeters.

In another aspect, the invention relates to a method of manufacturing a glass screen protector for application to a screen of an electronic device. The method includes providing a sheet of soda-lime glass; cutting one or more openings in the sheet of soda-lime glass to provide one or more individual pieces of soda-lime glass, the one or more individual pieces of soda-lime glass having a front side surface and a rear side surface; forming one or more cutouts or openings in the one or more individual pieces of soda-lime glass; tempering the one or more individual pieces of soda-lime glass; cleaning the one or more individual pieces of soda-lime glass in an ultrasonic wash bath; applying a non-conductive vacuum metallization layer to the rear side surface of the one or more individual pieces of soda-lime glass; applying a masking paint pattern to the rear side surface of the one or more individual pieces of soda-lime glass; placing the one or more individual pieces of soda-lime glass in an chemical reagent bath, the chemical reagent bath removing the non-conductive vacuum metallization layer from the rear side surface of the one or more individual pieces of soda-lime glass except where the masking paint pattern was applied; and placing the one or more individual pieces of soda-lime glass in a solvent wash, the solvent wash removing the masking paint pattern to expose the non-conductive vacuum metallization layer on the rear side surface, the non-conductive vacuum metallization layer comprising the same pattern as the masking paint pattern.

In example embodiments, the method further includes applying indicia to the front side surface of the one or more individual pieces of soda-lime glass; applying an optically clear adhesive layer on the rear side surface; and applying a protective sheet on the front and rear side surfaces. In example embodiments, the protective sheet is formed from plastic is removable by the end user during the installation thereof. In example embodiments, an oleophobic layer can be applied to the one or more individual pieces of soda-lime glass.

In yet another aspect, the invention relates to a method of manufacturing a glass screen protector including providing one or more individual pieces of glass having a front side surface and a rear side surface; forming one or more cutouts or openings in the one or more individual pieces of glass; tempering the one or more individual pieces of glass; cleaning the one or more individual pieces of glass in an ultrasonic wash bath; applying a non-conductive vacuum metallization layer to the rear side surface of the one or more individual pieces of glass; applying a masking paint pattern to the rear side surface of the one or more individual pieces of glass; placing the one or more individual pieces of glass in a chemical reagent bath, the chemical reagent bath removing the non-conductive vacuum metallization layer from the rear side surface of the one or more individual pieces of glass except where the masking paint pattern was applied; and placing the one or more individual pieces of glass in a solvent wash, the solvent wash removing the masking paint pattern to expose the non-conductive vacuum metallization layer on the rear side surface, the non-conductive vacuum metallization layer comprising the same pattern as the masking paint pattern.

In example embodiments, the method further includes providing a sheet of glass and cutting one or more individual pieces of glass out of the sheet of glass, each individual piece of glass comprising a front side surface and a rear side surface. In one example form, the glass comprises a soda-lime glass.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1 is a perspective view of a glass screen protector according to an example embodiment of the present invention, the glass screen protector being spaced a distance apart from a portable electronic device.

FIG. 2 is another perspective view of the glass screen protector and portable electronic device of FIG. 1, showing the glass screen protector spaced a distance apart from the screen of the portable electronic device and showing a case or cover coupled with the portable electronic device.

FIG. 3 is a plan view of the glass screen protector and portable electronic device of FIG. 1, showing the glass screen protector adhered to the screen of the portable electronic device.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figures 4, 5:
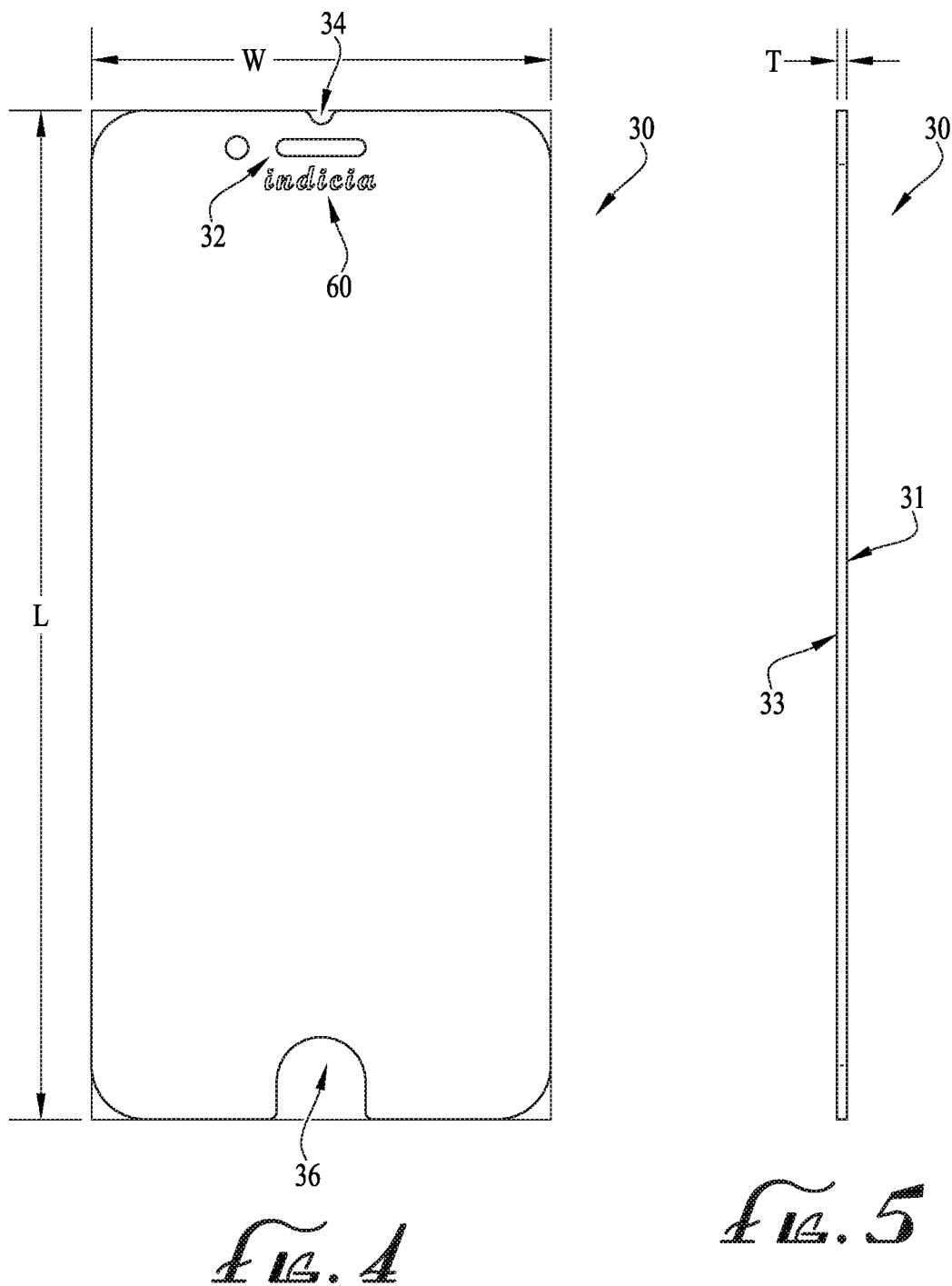
FIG. 4 is a plan view of the glass screen protector of FIG. 3, wherein a printed pattern is removed from the glass screen protector according to one example embodiment of the present invention.
FIG. 5 is a side view of the glass screen protector of FIG. 4.

With reference now to the drawing figures, wherein like reference numbers represent corresponding parts throughout the several views, FIGS. 1-5 show a glass screen protector 30 according to an example embodiment of the present invention. In example embodiments, the screen protector 30 comprises a front side surface 31, a rear side surface 33, a length L, a width W and a thickness T (see FIG. 4). In example embodiments as will be described below, the rear side surface 33 comprises an optically clear adhesive tape for providing adhesion of the screen protector 30 to a screen or display surface DDS of an electronic device D. According to the depicted example embodiment, the electronic device D comprises an Apple iPhone® defining a length $L_D$ and a width $W_D$. In example embodiments, the length $L_D$ is between about 63.5-381 millimeters and the width $W_D$ is between about 63.5-381 millimeters. For example, in example embodiments, the electronic device D can take on various forms, sizes and shapes, and the screen protector 30 can preferably be sized and shaped for application to at least a portion thereof, for example, the screen and/or other portions of the electronic device D as desired. According to one example embodiment and as depicted in FIGS. 4-5, the screen protector 30 comprises a length L of between about 101.60-304.80 millimeters, a width W of between about 53.34-228.60 millimeters, and a thickness of between about 0.20-0.40 millimeters. Optionally, the screen protector 30 can be sized as desired.

In example embodiments, the protective cover 30 can preferably be adhered to the screen DDS of the electronic device D such that at least a majority of the screen DDS is substantially covered. As depicted throughout the figures and described above, the screen protector 30 is generally sized to cover an electronic device D in the form of an Apple iPhone®. Optionally, the screen protector 30 can be sized to provide compatibility with other electronic devices such as other smart phones, tablets, etc. In alternate example embodiments, the screen protector 30 can be configured for covering screens or other interfaces or displays where protection is desired. In example embodiments, the screen protector 30 is compatible for protecting the screen DDS of the electronic device D when the electronic device D is not covered by a protective case or cover DC. Optionally, the case DC can be used in combination with the screen protector 30.

In example embodiments, the screen protector 30 can comprise one or more patterned features formed or printed on one or both side surfaces 31, 33. For example, according to example embodiments, a printed pattern 50 is formed by a non-conductive vacuum metallization process and provided on the rear side surface 33 of the screen protector 30. In example embodiments, the printed pattern 50 can comprise an array of dashed lines, cross hatch patterns, polka dots or another desirable print or pattern (see FIGS. 1-3 and 6). For example, the printed pattern 50 in FIGS. 1-3 comprises a cross hatch pattern and the printed pattern 50 of FIG. 6 comprises polka dots. Optionally, other desired patterns, images, etc. can be provided as desired.

In example embodiments, the printed pattern 50 is configured such that the non-conductive vacuum metallization exposes a metallic-like coating or layer to provide a gilded appearance or metallic-like sheen. In some example embodiments, a logo or other indicia 60 can be printed on one or both side surfaces 31, 33. For example, according to some example embodiments, indicia 60 is applied to the front side surface 31 by using a silk screen printing process. Optionally, other printing, etching or engraving processes can be utilized to apply indicia to one or both of the side surfaces of the protector 30. In some example embodiments, only the indicia 60 or the pattern 50 is applied to the protector 30. For example, as depicted in FIG. 4, the protector 30 only comprises the indicia 60 printed on the front side surface 31. Optionally, both the indicia 60 and pattern 50 are applied thereto (see FIGS. 1-3). Further optional, one or both side surfaces 31, 33 can comprise an iridescent layer. According to one example embodiment, the iridescent layer is substantially solid and continuous, for example, rather than exhibiting a pattern. Optionally, in a similar fashion as described above, the iridescent layer can be patterned as desired.

Figure 7:
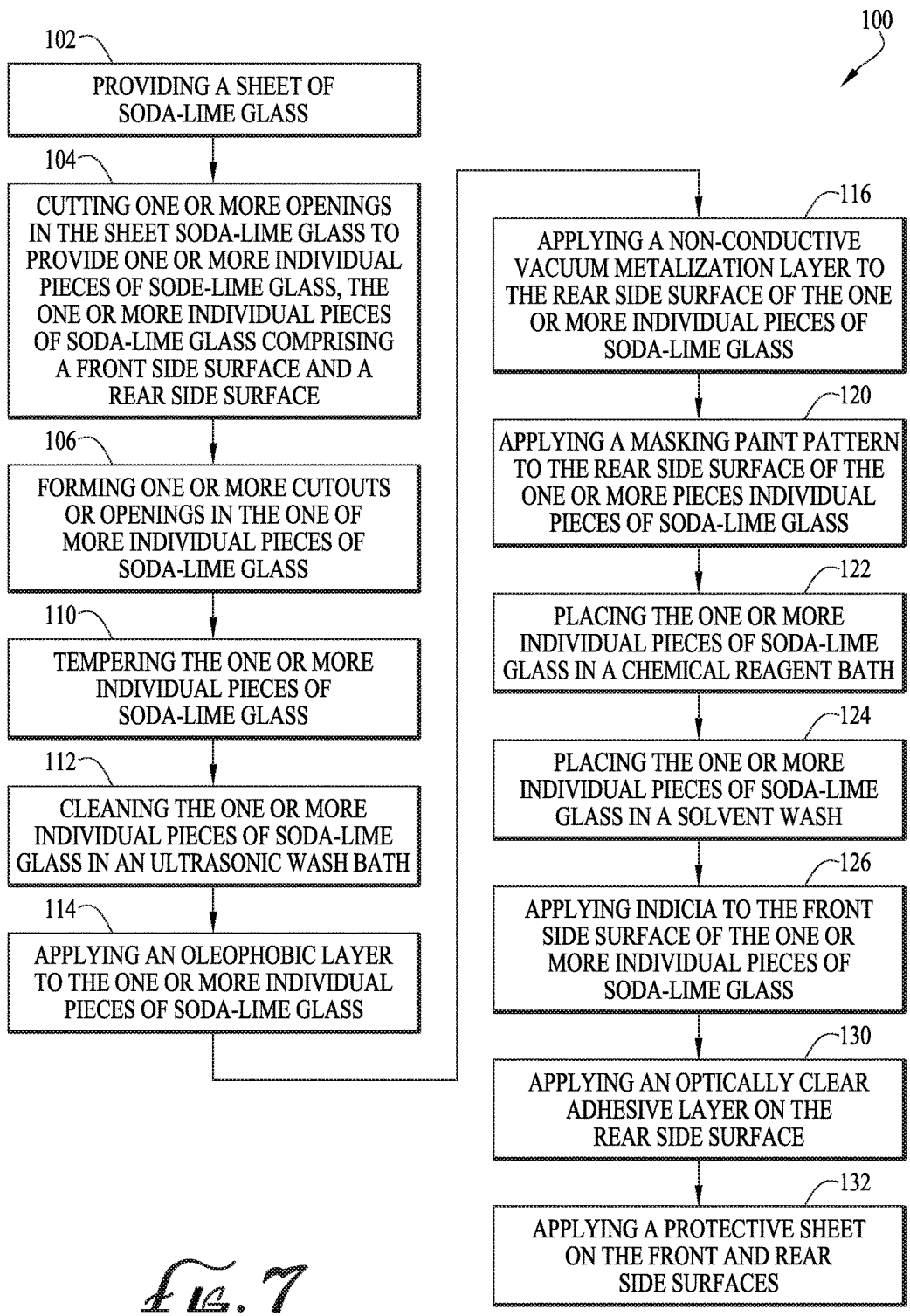
FIG. 7 shows a flowchart of the method of manufacturing screen protectors of FIG. 6.

According to another example embodiment, the present invention relates to a method 100 of manufacturing a glass screen protector 30 (see FIG. 7). In example embodiments, the method 100 generally comprises the step 102 of providing a sheet 10 of soda-lime glass; the step 104 of cutting one or more openings 14 in the sheet 10 of soda-lime glass to provide one or more individual pieces of soda-lime glass, the one or more individual pieces of soda-lime glass comprising a front side surface 31 and a rear side surface 33; the step 106 of forming one or more cutouts or openings (32, 34, 36) in the one or more individual pieces of soda-lime glass; the step 110 of tempering the one or more individual pieces of soda-lime glass 30; the step 112 of cleaning the one or more individual pieces of soda-lime glass 30 in an ultrasonic wash bath; the step 116 of applying a non-conductive vacuum metallization layer to the rear side surface 33 of the one or more individual pieces of soda-lime glass 30; the step 120 of applying a blue acid resistant or masking paint pattern to the rear side surface 33 of the one or more individual pieces of soda-lime glass 30; the step 122 of placing the one or more individual pieces of soda-lime glass 30 in an acid or chemical reagent bath, the chemical reagent bath removing the non-conductive vacuum metallization layer from the rear side surface of the one or more individual pieces of soda-lime glass except where the masking paint pattern was applied; and the step 124 of placing the one or more individual pieces of soda-lime glass in a solvent wash, the solvent wash removing the masking paint pattern to expose the non-conductive vacuum metallization layer on the rear side surface, the non-conductive vacuum metallization layer comprising the same pattern as the masking paint pattern. According to some example embodiments, the method further comprises the step 126 of applying indicia to the front side surface 31 of the one or more individual pieces of soda-lime glass; the step 130 of applying an optically clear adhesive layer on the rear side surface; and the step 132 of applying a protective sheet on the front and rear side surfaces.

According to some example embodiments, an oleophobic layer can be applied to the one or more individual pieces of soda-lime glass 30 (see step 114). In example embodiments, the application of the oleophobic layer to the one or more individual pieces of soda-lime glass is performed after step 112 of cleaning the one or more individual pieces of soda-lime glass in an ultrasonic wash bath and prior to the step 116 of applying the non-conductive vacuum metallization layer to the rear side surface of the one or more individual pieces of soda-lime glass.

Figure 6:
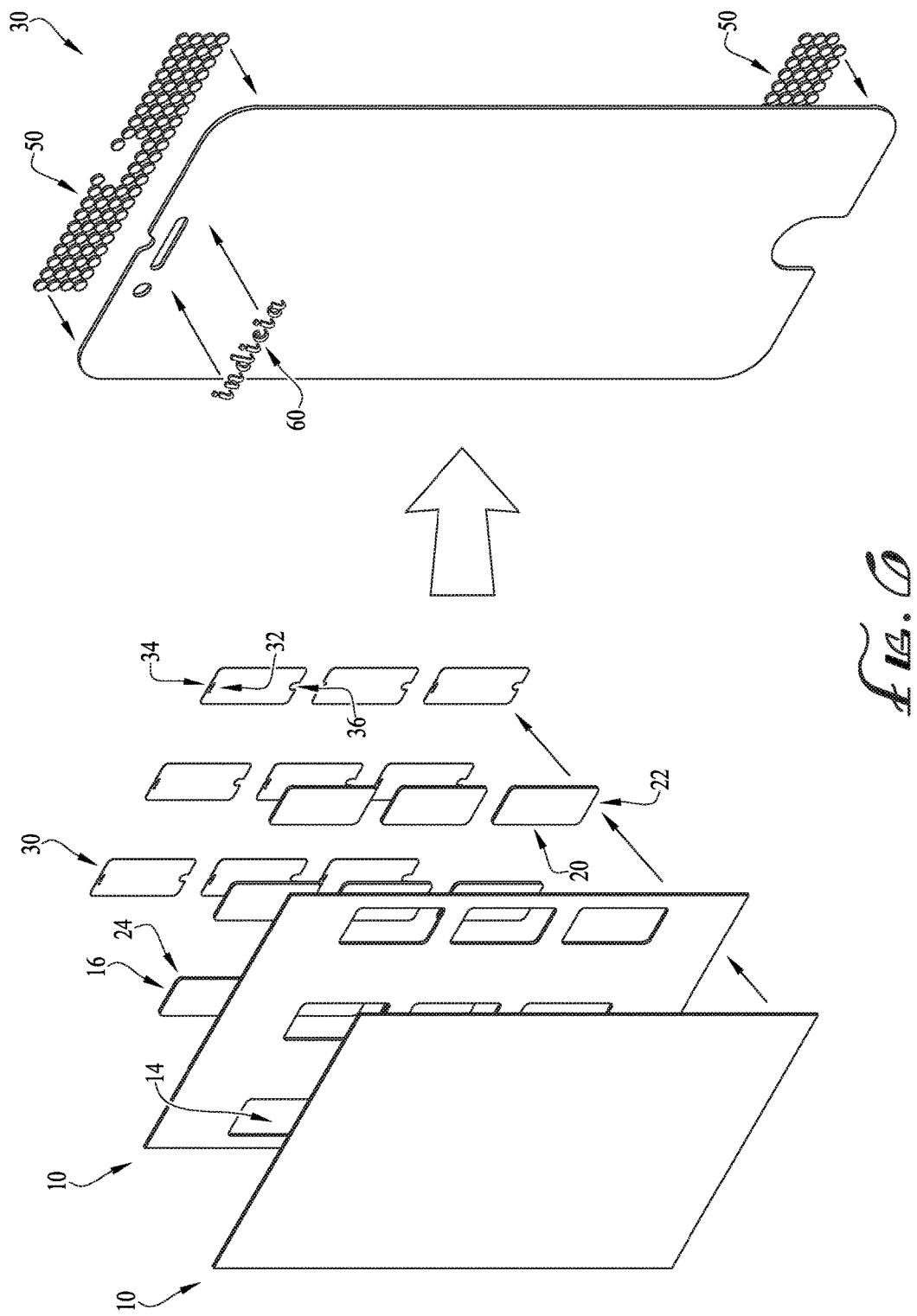
FIG. 6 shows a method of manufacturing glass screen protectors according to another example embodiment of the present invention.

In example embodiments, the sheet of soda-lime glass 10 is cut with a diamond (e.g., a diamond cutting tool, diamond cutter, etc.) whereby one or more openings 14 are defined in the sheet 10, for example, to provide one or more individual pieces of soda-lime glass 16 (see FIG. 6). In example embodiments and as described above, each of the one or more individual pieces of soda-lime glass 16 define a length L and a width W. In example embodiments, each piece of soda-lime glass 16 is cut from the sheet of soda-lime glass 10 to define generally linear side and upper/lower edges 20, 22. In example embodiments, rounded or radiused corners 24 are provided between the side and upper/lower edges 20, 22, for example, to provide a substantially smooth transition between the edges 20, 22. In example embodiments, the rounded corners 24 are generally curved to substantially match the contour or curvature of the electronic device D. Optionally, the corners 24 can be shaped as desired.

As further depicted in FIG. 6, the individual pieces of soda-lime glass are then further processed whereby one or more features, openings, slots, notches, cutouts, etc. (see 32, 34 and 36) are formed in each piece of soda-lime glass 16 to define the appropriately sized and patterned protector 30. In example embodiments, a CNC router can be used to cut out the pieces of soda-lime glass 16 in addition to cutting out the one or more features. According to one example embodiment and as described herein, the features (32, 34 and 36) are formed in each piece of soda-lime glass 16 after being separated from the sheet of soda-lime glass 10. However, in other example embodiments, one or more of the features can be formed in the sheet of soda-lime glass 10 prior to separation of the pieces of soda-lime glass 16 from the sheet 10. Thus, according to example embodiments, the features (32, 34 and 36) can be cut or defined in the sheet 10 prior to separating the pieces 16 from the sheet 10, thereby reducing the handling and manufacturing process thereof. Furthermore, according to one example embodiment, the side and upper/lower edges 20, 22 of the protector 30 are generally rounded or at least partially curved to provide a smooth transition between the front and rear side surfaces 31, 33.

After the individual pieces are cut from the sheet and processed to define the features (32, 34 and 36), each protector 30 is then tempered (see step 110), washed via an ultrasonic bath (see step 112), and an optional oleophobic coating is applied to the entirety thereof (see step 114). In example embodiments, the protector 30 is strengthened/tempered using potassium nitrate and the oleophobic coating is fluoropolymer-based. In example embodiments, a non-conductive vacuum metallization layer is applied on the rear side surface 33 (see step 116) and then a layer of masking patterned paint 40 is similarly applied to the rear side surface 33 (see step 120). In example embodiments, the patterned paint 40 is generally applied on the rear side surface 33 to extend generally entirely along the width W of the protector and to have a length L, for example, which is generally dimensioned such that the entirety of the device D screen DDS is visible without any visual interference from the patterned paint 40. Optionally, the patterned paint 40 can be sized to cover a desired portion of the protector 30.

In example embodiments, the protector 30 is then placed in an acid wash to remove the non-conductive vacuum metallization layer from the rear side surface (see step 122). Preferably, the non-conductive vacuum metallization layer is not removed from the rear side surface where the masking patterned paint 40 was applied. The protector 30 is then placed in a solvent wash to remove the masking paint, thereby leaving a substantially similar patterned non-conductive vacuum metallization layer 50 on the rear side surface (see step 124). As depicted in FIGS. 1, 4 and 6, the front side surface 31 can be provided with indicia 60 as desired. According to one example embodiment, the indicia 60 is in the form of a logo or text, which is applied to the front side surface 31 by a silk screen process (see step 126).

An optically clear adhesive is then applied to the rear side surface 33 of the protector 30 for facilitating adhesion of the protector 30 with the screen DDS of the electronic device (see step 130). According to one example embodiment, a protective sheet can be applied to the front and rear side surfaces 31, 33 to generally protect the protector 30 until it is desired to install on the device D (see step 132). When it is desired to install the protector 30 on the screen DDS of the device D, the protective layers are peeled off from the front and rear side surfaces 31, 33 and disposed.

According to another example embodiment of the present invention, after cleaning the one or more pieces of soda-lime glass in an ultrasonic wash bath and optional application of the oleophobic layer to the one or more individual pieces of soda-lime glass, one or more individual pieces of masking tape comprising one or more die-cut patterns can be applied to the rear side surface of the one or more individual pieces of soda-lime glass. A non-conductive vacuum metallization layer is then applied to the rear side surface of the one or more individual pieces of soda-lime glass. Thereafter, the masking tape is removed to leave the non-conductive vacuum metallization layer on the rear side surface. In example embodiments, the non-conductive vacuum metallization layer comprises the same pattern as the masking tape die-cut pattern.

In example embodiments, the screen protector as described herein comprises a 9H harness rating on the Mohs hardness scale, thereby substantially eliminating the likelihood of the screen protector being scratched or damaged, and thereby preserving the quality and visibility of the screen of the electronic device. In example embodiments, the screen protector preferably comprises a high touch sensitivity function such that screens, for example, touch screens, can be operated and function seamlessly, for example, as if no screen protector was present. In example embodiments, the screen protector preferably reduces impressions or the likelihood of a user's finger print remaining present thereon during use, and thus, remains substantially (if not entirely) transparent without attracting or maintaining deposits of oil or other substances that could lead to a user's finger prints remaining visible on the surface of the screen protector. Furthermore, the screen protector as described herein preferably acts to protect the screen during accidental drops, scrapes and other potential accidents.

According to yet another example embodiment of the present invention, aluminosilicate glass can be alternatively used rather than the soda-lime glass as described above. For example, as shown in the method of FIG. 7, the step 102 of providing a sheet of soda-lime glass can alternatively comprise the step of providing a sheet of aluminosilicate glass. Accordingly, the proceeding steps 104-132 are substantially similar with the exception that aluminosilicate glass is substituted for the soda-lime glass. According to additional example embodiments of the present invention, the screen protector of the present invention can comprise other natural or synthetic materials as desired, for example, other glass materials and/or combinations of glass substances or compositions mixed with other natural and/or synthetic materials.

While the invention has been described with reference to example embodiments, it will be understood by those skilled in the art that a variety of modifications, additions and deletions are within the scope of the invention, as defined by the following claims.

What is claimed is:

1. A method of manufacturing a glass screen protector for application to a screen of an electronic device, the method comprising:
   providing a sheet of soda-lime glass;
   cutting one or more openings in the sheet of soda-lime glass to provide one or more individual pieces of soda-lime glass, the one or more individual pieces of soda-lime glass comprising a front side surface and a rear side surface;
   forming one or more cutouts or openings in the one or more individual pieces of soda-lime glass;
   tempering the one or more individual pieces of soda-lime glass;
   cleaning the one or more individual pieces of soda-lime glass in an ultrasonic wash bath;
   applying a non-conductive vacuum metallization layer to the rear side surface of the one or more individual pieces of soda-lime glass;
   applying a masking paint pattern to the rear side surface of the one or more individual pieces of soda-lime glass;
   placing the one or more individual pieces of soda-lime glass in a chemical reagent bath, the chemical reagent bath removing the non-conductive vacuum metallization layer from the rear side surface of the one or more individual pieces of soda-lime glass except where the masking paint pattern was applied; and
   placing the one or more individual pieces of soda-lime glass in a solvent wash, the solvent wash removing the masking paint pattern to expose the non-conductive vacuum metallization layer on the rear side surface, the non-conductive vacuum metallization layer comprising the same pattern as the masking paint pattern.

2. The method of claim 1, further comprising applying indicia to the front side surface of the one or more individual pieces of soda-lime glass.

3. The method of claim 1, further comprising applying an optically clear adhesive layer on the rear side surface.

4. The method of claim 3, further comprising applying a protective sheet on the front and rear side surfaces.

5. The method of claim 4, wherein the protective sheet is formed from plastic.

6. The method of claim 5, wherein the protective sheet is removable by the end user during installation thereof.

7. The method of claim 1, further comprising applying an oleophobic layer to the one or more individual pieces of soda-lime glass.

8. A method of manufacturing a glass screen protector for application to a screen of an electronic device, the method comprising:
   providing a sheet of soda-lime glass;
   cutting one or more openings in the sheet of soda-lime glass to provide one or more individual pieces of soda-lime glass, the one or more individual pieces of soda-lime glass comprising a front side surface and a rear side surface;
   forming one or more cutouts or openings in the one or more individual pieces soda-lime glass;
   tempering the one or more individual pieces soda-lime glass;
   cleaning the one or more individual pieces soda-lime glass in an ultrasonic wash bath;
   applying an oleophobic layer to the one or more individual pieces soda-lime glass;
   applying one or more individual pieces of masking tape with a die-cut pattern to the rear side surface of the one or more individual pieces soda-lime glass;
   applying a non-conductive vacuum metallization layer to the rear side surface of the one or more individual pieces soda-lime glass;
   removing the masking tape to leave a non-conductive vacuum metallization layer on the rear side surface, the non-conductive vacuum metallization layer comprising the same pattern as the masking tape die-cut pattern.

9. A method of manufacturing a glass screen protector for application to a screen of an electronic device, the method comprising:

providing one or more individual pieces of glass comprising a front side surface and a rear side surface;
forming one or more cutouts or openings in the one or more individual pieces of glass;
tempering the one or more individual pieces of glass;
cleaning the one or more individual pieces of glass in an ultrasonic wash bath;
applying a non-conductive vacuum metallization layer to the rear side surface of the one or more individual pieces of glass;
applying a masking paint pattern to the rear side surface of the one or more individual pieces of glass;
placing the one or more individual pieces of glass in a chemical reagent bath, the chemical reagent bath removing the non-conductive vacuum metallization layer from the rear side surface of the one or more individual pieces of glass except where the masking paint pattern was applied; and
placing the one or more individual pieces of glass in a solvent wash, the solvent wash removing the masking paint pattern to expose the non-conductive vacuum metallization layer on the rear side surface, the non-conductive vacuum metallization layer comprising the same pattern as the masking paint pattern.

10. The method of claim 9, further comprising providing a sheet of glass.

11. The method of claim 10, further comprising cutting out one or more individual pieces of glass from the sheet of glass, each individual piece of glass comprising a front side surface and a rear side surface.

12. The method of claim 9, wherein the glass comprises soda-lime glass.

13. The method of claim 9, further comprising applying an oleophobic layer to the one or more individual pieces glass.

* * * * *